UNITED STATES PATENT OFFICE.

FREDERICK W. KURK, OF CHICAGO, ILLINOIS, ASSIGNOR TO WILSON & COMPANY, OF CHICAGO, ILLINOIS, A CORPORATION OF NEW YORK.

ART OF CURING MEAT.

1,380,070.  Specification of Letters Patent.  Patented May 31, 1921.

No Drawing. Original application filed January 31, 1921, Serial No. 441,503. Divided and this application filed February 21, 1921. Serial No. 446,763.

*To all whom it may concern:*

Be it known that I, FREDERICK W. KURK, a citizen of the United States, residing at 6100 Greenwood Ave., Chicago, in the county of Cook and State of Illinois, have invented a new and useful Improvement in the Art of Curing Meat, (Case B,) of which the following is a specification.

The present invention relates to the art of curing or pickling meats, and will be fully understood from the description thereof hereinafter set forth.

In the curing or pickling of meats, including meats which are subsequently smoked, it is customary to employ a curing or pickling compound containing salt and a nitrate, such as saltpeter, with or without added substances, such as sugar and spices. As hitherto carried out, the results of curing meat have been variable, irregular and uncontrollable. Thus if a number of substantially identical pieces of meat, for example, hams, are placed in separate vats containing identical fresh curing or pickling solutions, it will be found at the end of the cure that the liquors in the several vats differ markedly from each other, as shown by their odor, taste and bacterial flora, and the meats from the several vats differ from each other in shade and uniformity of color, flavor, etc. This variation in results is likewise true in dry salt cures and in cures, such as of sausage, in which the curing compounds are incorporated or ground in with the meat to be cured.

I have now discovered that the cure of the meat may be made standard or substantially uniform in all or any cures by producing in each cure a dominant growth or culture of a single individual or type of bacterium. This bacterium I have found to be present in varying degrees of virility in all successful cures, its effective action being hindered to a greater or less extent or completely destroyed and uniformity of its action being prevented by the presence and activity of other bacteria, of which I have found upward of 80 in ordinary pickles or cures. This selected type of bacterium, which has not previously been isolated nor described, is identifiable by the following characteristics:

1. It is non-putrefactive.
2. It is non-pathogenic.
3. It is nitrate-reducing.
4. It is a micrococcus.

I have found that regular and uniform cures may be made by inoculating each fresh pickle or cure with a virile culture of this selected bacterium, whereby a dominant growth of this bacteria is produced. Under these circumstances the growth and virility of other bacterial flora normally present in cures or pickles is entirely prevented or so greatly reduced that they are unable to substantially affect the character or uniformity of the cure. It is likewise found that, by producing a dominant culture or growth of the selected bacteria in the curing meat an improved color and flavor of the cured meat results. The employment of the selected bacteria hence results in both an improvement in each individual pickle or cure as well as substantial uniformity in all pickling or cures.

The pickles or cures herein referred to may be either those in which the meat is immersed or soaked in a solution of the ingredients of the curing compound, those in which the curing compound is applied as a surface coating on the meat, for example, a dry salt cure, or those in which these ingredients are thoroughly mixed with the meat itself. The first two procedures are those generally employed, for example, with hams and the last with sausage, etc.

In inoculating the cure with the selected bacteria I prefer to employ a virile culture thereof, which may be produced, for example, by making a three day growth of the bacteria in bouillon, then transferring the bacteria to a sterile normal salt solution, which is applied in the cure in suitable proportions. To illustrate the practice of my invention, the following examples are given.

*Example No. 1.*—In making sausage the components of the cure are mixed directly with the meat, preferably during grinding. The curing constituents may be, for example, 5 lbs. salt, 2 oz. saltpeter and 3 to 10 min oz. sugar to 150 lbs. of meat. At the same time a virile culture of the selected bacteria is introduced, a three day culture in 250 cc. bouillon, transferred to a sterile normal salt solution, being added for each 150 lbs. of meat. The meat, pickle constituents and inoculating culture are thoroughly intermixed, together with any desired flavoring substances, the mixture is stuffed into casings, is stored and permitted to cure. The inoculation with the virile culture of the selected bacteria produces a dominant growth thereof, which substantially prevents such growth of other pickle bacteria as will cause interference with the flavor, taste or uniformity of the cure. It likewise prevents or greatly retards the growth and action of putrefactive bacteria.

*Example No. 2.*—A pickle solution is made by dissolving in water 16 to 20% of salt, 0.2 to 0.6% saltpeter and 1 to 4% sugar. Other flavoring ingredients, condiments or spices may be added, if desired. The solution is placed in vats or tierces, preferably thoroughly cleaned, and the meat, for example hams, to be cured is immersed in the solution. Either before or immediately after the introduction of the meat the pickle or solution is inoculated by adding thereto a normal salt solution containing a virile culture of the selected bacteria, for example, the bacteria of a three day growth of the bacteria in 250 cc. bouillon for each vat containing 1000 lbs. of meat to be cured. The growth of the selected bacteria becomes the dominant bacterial growth therein and the growth of others is inhibited to such an extent that they produce no substantial effect upon the cure. The time of cure may be from 50 to 60 days up, varying with the size of the hams being cured.

In cures such as the dry salt cure, in which the curing substances (salt and saltpeter) are made into a pasty mass with water and applied directly to the meats to be cured, the inoculating growth of bacteria may be added to the water used in making the aforesaid paste.

This application is a division of my prior application Serial No. 441,503 filed January 31, 1921.

Although the present invention has been described in connection with the specific details of procedure for carrying it into effect, it is not intended that these details shall be regarded as limitations upon the scope of the invention, except in so far as included in the accompanying claim.

I claim:

The process of curing meats which comprises applying superficially thereto curing materials containing nitrates and a virile culture of the non-putrefactive, nonpathogenic, nitrate-reducing micrococcus.

FREDERICK W. KURK.